(12) United States Patent
Letz et al.

(10) Patent No.: US 11,146,545 B2
(45) Date of Patent: Oct. 12, 2021

(54) APPARATUS AND METHOD FOR ESTABLISHING SECURED CONNECTION

(71) Applicant: Exosite LLC, Minneapolis, MN (US)

(72) Inventors: Dominic Immanuel Letz, Taipei (TW); Samuel Stuart Webster, Anacortes, WA (US); Hans Aaron Rempel, Dillard, OR (US)

(73) Assignee: EXOSITE LLC, Minneapolis, MN (US)

( * ) Notice: Subject to any disclaimer, the term of this patent is extended or adjusted under 35 U.S.C. 154(b) by 366 days.

(21) Appl. No.: 16/356,099

(22) Filed: Mar. 18, 2019

(65) Prior Publication Data

US 2019/0306150 A1 Oct. 3, 2019

Related U.S. Application Data (60) Provisional application No. 62/648,413, filed on Mar. 27, 2018.

(51) Int. Cl.
*H04L 29/06* (2006.01)
*H04L 9/06* (2006.01)
(Continued)

(52) U.S. Cl.
CPC ........ *H04L 63/0823* (2013.01); *H04L 9/0637* (2013.01); *H04L 9/3239* (2013.01);
(Continued)

(58) Field of Classification Search
CPC . H04L 63/0823; H04L 9/3239; H04L 9/0637; H04L 9/3247; H04L 63/065;
(Continued)

(56) References Cited

U.S. PATENT DOCUMENTS

| 10,572,855 B1* | 2/2020 | Levy .................. G06K 19/0723 |
| 2019/0132138 A1* | 5/2019 | Finlow-Bates ....... H04L 9/3236 |
| 2020/0295941 A1* | 9/2020 | Daniel .................. H04L 63/123 |

FOREIGN PATENT DOCUMENTS

| EP | 3386142 A1 * | 10/2018 | ............... H04L 9/06 |
| GB | 2549085 A | 10/2017 | |

(Continued)

OTHER PUBLICATIONS

Sathiya Kumaran Mani et al. "An architecture for IoT clock synchronization." The Internet of Things. ACM. 2 Penn Plaza. Suite 701New YorkNY10121-0701USA. Oct. 15, 2018 (Oct. 15, 2018), pp. 1-8.

(Continued)

*Primary Examiner* — Christopher A Revak
(74) *Attorney, Agent, or Firm* — McClure, Qualey & Rodack, LLP (57) ABSTRACT

A method for establishing secured connection on an apparatus, comprising: connecting to a network; retrieving a last known block header hash corresponding to a last known block in a last known blockchain; connecting to a plurality of trusted peers via the network; in response to each trusted peer being successfully connected, downloading a latest block header of the trusted peers; based on the last known block header hash, determining whether the latest block header of each trusted peers is referenced to the last known block; and in response to a first number exceeding a threshold number, verifying the latest block header to form a latest version blockchain, wherein the first number is a number of peers in the plurality of trusted peers being successfully connected, and the peers have the latest block header being referenced to the last known block.

22 Claims, 3 Drawing Sheets

(51) Int. Cl.
- *H04L 9/32* (2006.01)
- *H04L 29/08* (2006.01)
- *G06Q 20/30* (2012.01)
- *G16Y 40/50* (2020.01)

(52) U.S. Cl.
CPC .......... *H04L 9/3247* (2013.01); *H04L 63/065* (2013.01); *H04L 63/1466* (2013.01); *H04L 67/1046* (2013.01); *G06Q 20/308* (2020.05); *G16Y 40/50* (2020.01); *H04L 2209/38* (2013.01)

(58) Field of Classification Search
CPC .............. H04L 63/1466; H04L 67/1046; H04L 2209/38; H04L 63/12; G06Q 20/308; G16Y 40/50

See application file for complete search history.

(56) References Cited

FOREIGN PATENT DOCUMENTS

WO    WO 2017/167549 A1 * 10/2017 ............... H04L 9/32
WO    WO 2018/229531 A1 * 12/2018 ............... H04L 9/32

OTHER PUBLICATIONS

Satoshi Nakamoto, Bitcoin: A Peer-to-Peer Electronic Cash System, 2008.

Alexander Lechner, Low Probability, High Stakes: A look at PKI, Seminar Future Internet WS 2011/12.

Doowon Kimet al., Certified Malware: Measuring Breaches of Trust in the Windows Code-Signing PKI, o Association for Computing Machinery. 2017.

\* cited by examiner

APPARATUS AND METHOD FOR ESTABLISHING SECURED CONNECTION

CROSS-REFERENCE TO RELATED APPLICATION

This application claims priority to U.S. Provisional Application Ser. No. 62/648,413, filed on Mar. 27, 2018, which is herein incorporated by reference.

BACKGROUND

Technical Field

Present disclosure relates to a computing apparatus and a method for operating such apparatus. More particularly, present disclosure provides a computing apparatus for establishing secured connection via a blockchain and a method for operating such computing apparatus to establish secured connection.

Description of Related Art

In most of the cases, when an internet of things (IoT) device is made, it can be stored on a shelf of a warehouse for a time, may be for a couple of months or even years. At the first time the IoT device connects to an IoT network, a potential verification process may be triggered. However, people in the art can face a chicken-and-egg type problem when they try to establish the known public key infrastructure (PKI) in such IoT network. More specifically, when the IoT device goes online, it needs to establish at least two things: 1) the actual current time; 2) the secured validated connectivity. However, without the actual current time, the IoT device cannot validate PKI certificates, and without PKI certificate validation, the IoT device lacks of a trusted source of time.

SUMMARY

An aspect of present disclosure is to provide a method for establishing secured connection on an apparatus. The method comprises following steps: connecting to a network, by the apparatus; retrieving a last known block header hash corresponding to a last known block in a last known blockchain from a memory of the apparatus; connecting to a plurality of trusted peers via the network; in response to each of the plurality of trusted peers is successfully connected to, downloading a latest block header of the trusted peers being connected respectively; based on the last known block header hash, determining whether the latest block header of each of the plurality of trusted peers is referenced (reference-able via a continuous chain of blocks with matching block header hashes) to the last known block; and in response to a first number exceeding a threshold number, verifying the latest block header to form a latest version blockchain extending from the last known blockchain, wherein the first number is a number of first peers in the plurality of trusted peers being successfully connected, and the first peers have the latest block header being referenced to the last known block.

Another aspect of present disclosure is to provide an apparatus for establishing secured connection. The apparatus at least comprises a memory and a processor. The memory and the processor are electrically coupled with each other. The memory is configured to store computer readable instructions and a last known block header hash corresponding to a last known block in a last known blockchain. The processor is configured to retrieve the computer readable instructions to execute the following: connecting to a network; retrieving the last known block header hash; connecting to a plurality of trusted peers via the network; in response to each of the plurality of trusted peers is successfully connected to, downloading a latest block header of the trusted peers being connected respectively; based on the last known block header hash, determining whether the latest block header of each of the plurality of trusted peers is reference-able via a continuous blockchain to the last known block; and in response to a first number exceeding a threshold number, verifying the latest block header to form a latest version blockchain extending from the last known blockchain, wherein the first number is a number of first peers in the plurality of trusted peers being successfully connected, and the first peers have the latest block header being referenced to the last known block.

BRIEF DESCRIPTION OF THE DRAWINGS

Present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the following description and claims, units being described with singulars, such as "one", "the", "that", and "this" are not intended to limit the numbers of the described unit.

In the following description and claims, the terms "first", "second", and the like are not intend to limit a specific order of the units being described.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

In the following description and claims, the term "and/or" may be used to describe one of a plurality things or a combination or said things.

In the following description and claims, some of the directions "up", "down", "before", "after", "prior to", "behind" and the like can be considered as references along with the figures. The scope of present disclosure should not be limited thereto.

In the following description and claims, the terms "miner", "peer", "block creator" and the like can be considered interchangeable as references to the same participants in the network acting in the specific context of the description. The usage of the different terms is meant to provide context but not to limit scope of the disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Figure 1:
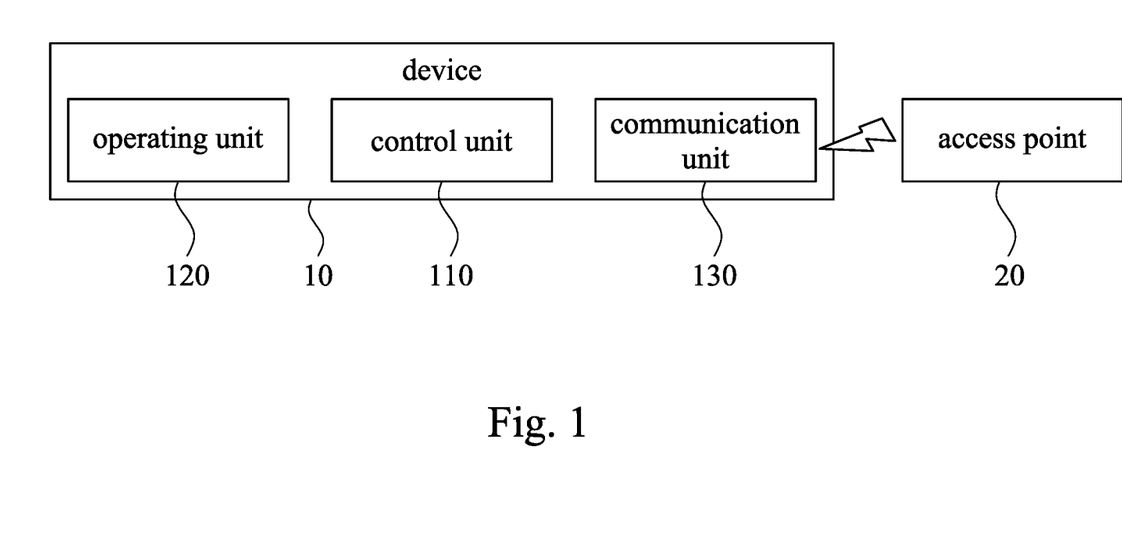
FIG. 1 is a schematic diagram illustrating a device for establishing secured connection according to some embodiments of present disclosure.

Reference is now made to FIG. 1. FIG. 1 is a schematic diagram illustrating a device 10 for establishing secured connection according to some embodiments of present disclosure. In some embodiments, the device 10 includes a control unit 110, an operating unit 120 and a communication unit 130, in which the control unit 110 may be electrically coupled to the operating unit 120 and the communication unit 130. In some embodiments, the device 10 is an IoT device.

In some embodiments, the control unit 110 has a memory 112 and a processor 114 electrically coupled with each other so that the control unit 110 may work as a core to manage the device 10, especially to manage the operating unit 120 of the device 10.

In some embodiments, the processor 114 may be formed by, but not limited to, a single processing circuit (e.g. CPU, GPU) or integrated microprocessors (e.g. Application Specific Integrated Circuits). In some embodiments, the memory 112 may be a transitory/non-transitory internal memory having instructions stored therein that defines a specific method for controlling the operating unit 120. The processor 114 may access these instructions to execute the specific method according to the instructions. In other words, the memory 112 is considered a non-transitory computer readable medium for the control unit 110 to control the operating unit 120. However, it is understood that the above embodiments are for exemplary purpose but not to limit the scope of present disclosure.

In some embodiments, the operating unit 120 may be an electrical/mechanical part being used to perform some predetermined functions/operations according to the purpose of the device 10. For example, in the case the device 10 is a washing machine, the operating unit 120 may be a motor for driving the inner drum of the washing machine. For example, in the case the device 10 is an electric light device, the operating unit 120 may be a lamp being secured in a body of the electric light device. However, it is understood that the above embodiments are for exemplary purpose but not to limit the scope of present disclosure.

In some embodiments, the communication unit 130 may be an electrical part configured to send-out/receive signals so that the control unit 110 connected thereto may establish bidirectional information exchange with other devices. For example, in some embodiments, the communication unit 130 may include a radio frequency signal transceiver configured to emit/receive radio frequency signals (e.g. signals in Wi-Fi standard) carrying coded information with some instructions. Via the radio frequency signals emitted/received by the radio frequency signal transceiver, the control unit 110 may communicatively connect to an access point around the device 10 in order to link to a network (e.g. IoT network).

In other words, in the embodiments of FIG. 1, the control unit 110, the operating unit 120 and the communication unit 130, as a whole, may be configured to perform some predetermined functions/operations of the device 10. However, it is noted that the embodiments are not intended to limit the scope of present disclosure. Alternative configurations of the device 10 are possible.

As mentioned in the "Description of Related Art", after the device 10 was manufactured, it is possible that the device 10 may be stored in the warehouse under an off-line state. In some embodiments, once the device 10 starts up, a predetermined process may be automatically executed for the control unit 110 to access the communication unit 130 in order to connect to available networks. The control unit 110 may connect to an access point 20 around. Then, the control unit 110 may try to retrieve the actual current time from a blockchain via the access point 20 since without the actual current time the PKI certificate validation may not be established. In some embodiments, the processor 114 of the control unit 110 may fetch instructions from the memory 112 to perform such predetermined process to determine whether the time source in the blockchain can be trusted. It is noted that the predetermined process may, at least, include several steps and the steps would be explained in the following paragraphs with drawings.

In some embodiments, it is known that a blockchain is actually a virtual data chain formed by a series of blocks being approved by some distributed nodes in a network. These blocks are referenced with each other one-after-one so that the entirety of the chain can be guaranteed. The nodes in the network are known as miners of the blocks in the blockchain. When transactions are made, the transactions would be sent to a pool and wait to be collected into a new block for verification. In a Proof-of-Work (PoW) design, a miner (i.e. a node) may compete with others in the network to verify the transactions in the pool according to specific hash algorithms with possessed computing powers. The fastest miner successfully verifies the transaction wins (also called mines) the new block. In some embodiments, the new block may be cryptographically signed by its miner with the miner's private key, which is called a signature of the miner.

In some embodiments, as a consensus in the network, the identity, the cryptographic signature and the address of the miner may be stored in a block header of the block. The new chain with the new block may be broadcast to the network. Other miners in the network may confirm whether the verification of the new block and the past blocks are correct. If the new chain is approved by these miners, this version of the chain may be recognized as the longest chain (also considered the authoritative one) in the network. It is noted that, through the address of the block creator being stored in each block header, other miners in the network may try to connect to the block creator.

In some related approaches, a typical blockchain mechanism may have certain potential problems. For example, since the typical mechanism always trust the longest chain, a malicious miner may fake the longest chain and has it broadcasted to the network. With enough hash power, the non-authoritative chain would be recognized authoritative by the network. The theory is known as 51% attack. Fortunately, the high cost of 51% attack makes it difficult. It is noted that, the concept of 51% attack may be used to employ a predetermined threshold in some embodiments of present disclosure. Detailed configurations about this matter are given in the paragraphs below.

There is another relatively easy attack known as man-in-the-middle attack. In a typical man-in-the-middle attack, when the device 10 boots up, it is possible that the access point 20 being connected by the device is a compromised (or rogue) access point. Through this access point 20, the device may only access to an infected network through which it can only access a single non-authoritative copy of the chain. This mechanism makes IoT devices vulnerable to fake time-server attacks. To prevent such attacks, in some embodiments of present disclosure, the processor 114 of the control device 110 may perform said predetermined process to check whether the time source in the network can be trusted and/or establish the current time directly from identifying the authoritative blockchain and timestamps herein.

Figure 2:
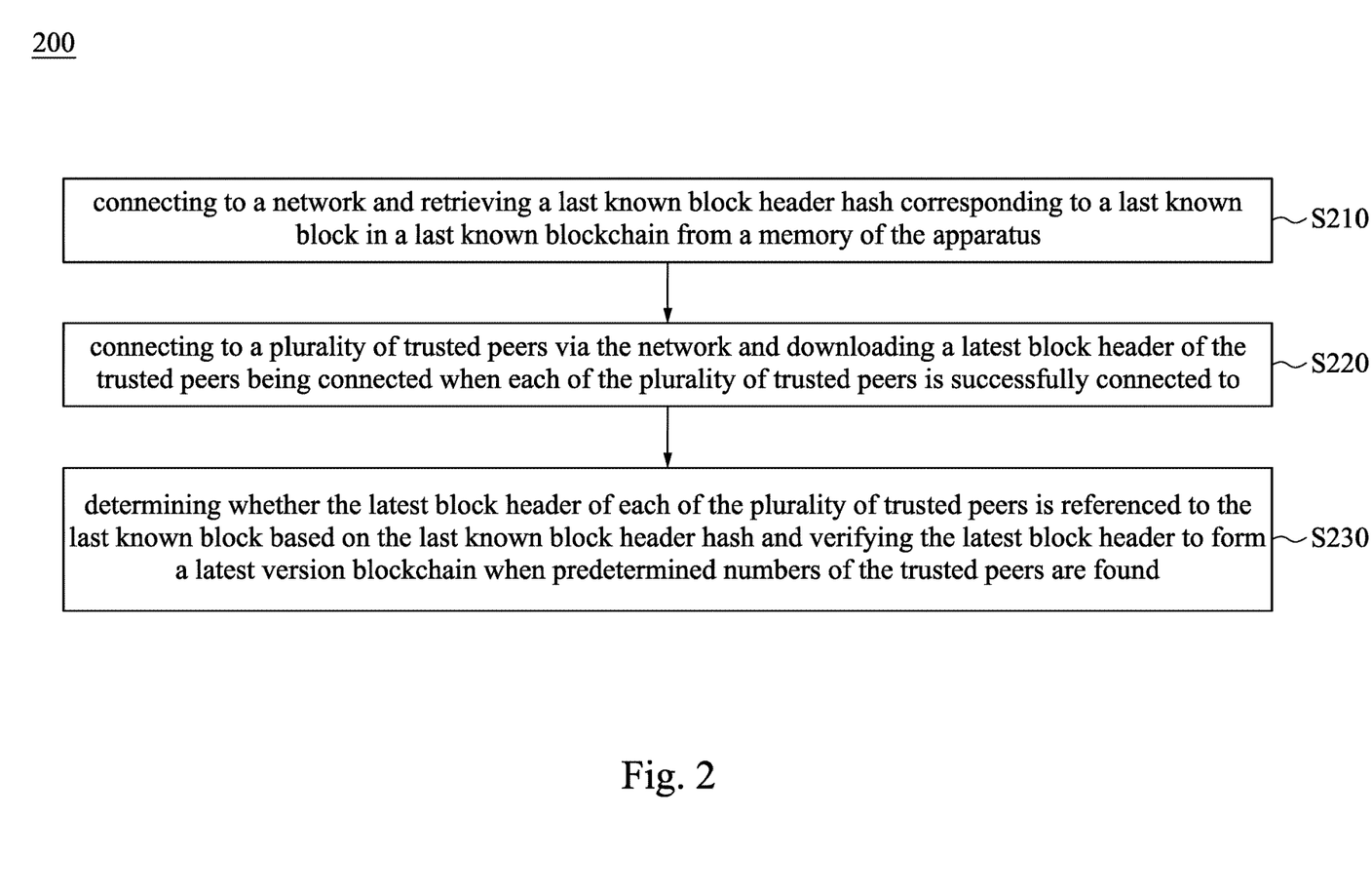
FIG. 2 is a flow chart showing a method for secure connectivity according to some embodiments of present disclosure.

FIG. 2 is a flow chart showing a method 200 for secure connectivity according to some embodiments of present disclosure. In some embodiments, a method 200 can be performed by the device 10 shown in FIG. 1. For ease of understanding, reference is made to FIG. 1 and FIG. 2. More specifically, in the embodiments of FIG. 1, the instructions are stored in the memory 112 of the control device 110. The instructions are associated with the method 200 shown in FIG. 2. The processor 114 of the control device 110 can access and execute the instructions from the memory 112 to perform the method 200. The method 200 may be used to check whether the blockchain the device 10 connected to is trustable. In some embodiments, steps of the method 200 will be explained in the paragraphs below.

Step S210: connecting to a network and retrieving a last known block header hash corresponding to a last known block in a last known blockchain from a memory of the apparatus.

Figure 3:
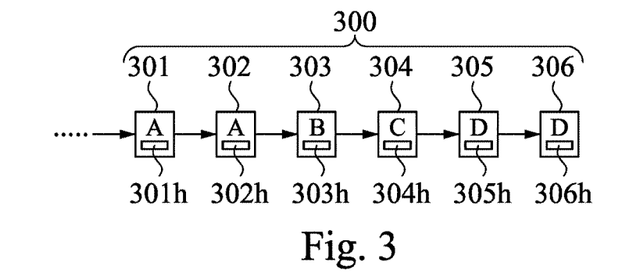
FIG. 3 is a schematic diagram showing parts of a blockchain according to some embodiments of present disclosure.

For better understandings, referring to FIG. 3. FIG. 3 is a schematic diagram showing parts of a blockchain according to some embodiments of present disclosure. In FIG. 3, part of a trusted blockchain 300 is shown. This part of the trusted blockchain 300 is formed by blocks 301-306 that are mined by some miners in the network. The miners are considered "trusted miners" to the degree they have authored blocks in the authoritative blockchain. Each block in this blockchain 300 has a block header recording at least the identity, the signature, and/or the address of its creator, cryptographically. For example, if a miner A created the block 301, the block header 301h records at least the authorship of block 301, including the identity, the signature, and/or the address of the miner A, and/or a timestamp of the creation date. In some cryptographic embodiments, the identity might be included or recoverable from the signature itself. As shown in the figure, the block 306 at the end of the blockchain 300 is the last block when the blockchain 300 is accessed. The authorship of block 306 is recorded in the block header 306h as well. It is noted that the block headers 302h-305h of the blocks 302-305 also records corresponding information and will not be repeated here.

In some embodiments, at the time the device 10 was manufactured, the manufacturer may access the authoritative blockchain 300. In some embodiments, the manufacturer may analyze the blockchain 300 to gain peer data about the miners in the network. In some embodiments, the manufacturer may also input at least one block header (e.g. the block header 306h of the last block 306) of the blockchain 300 into a specific hash algorithm to gain a checksum (or say a block header hash). In some embodiments, the checksum may be recorded in the memory 112 of the control unit 110 for verification. In some embodiments, the peer data may be optionally recorded in the memory 112 of the control unit 110 for verification.

In some embodiments, the peer data of the blockchain 300 may include a list of peers in the network. The list of peers may record the internet addresses of the known miners in the blockchain 300 and/or the signatures and/or the identities of the known miners in the blockchain 300. More specifically, in some embodiments, as shown in FIG. 3, the blocks 301-302 may be created by the miner A, the block 303 may be created by a miner B, the block 304 may be created by a miner C, and the blocks 305-306 may be created by a miner D. In the embodiments, since the manufacturer has accessed the blockchain 300, the internet addresses and/or the signatures and/or the identities of the miners A-D may be stored in the memory 112. According to the peer data, the miners A-D are trusted peers at the time the device 10 was manufactured.

In some embodiments, the list of peers further may record the percentages of the blocks created by these miners in the blockchain 300 and/or a subset thereof (may be shown in the statistic report). It is assumed that, in the exemplary embodiment, the miner A created 30% of blocks in the entire blockchain 300, the miner B created 15% of blocks in the entire blockchain 300, the miner C created 13% of blocks in the entire blockchain 300 and the miner D created 14% of blocks in the entire blockchain 300 (at the time the device 10 was manufactured). It is noted that the rest of blocks (the part not shown in the figure) in the blockchain 300 may have been created by other miners (not mentioned in the embodiment) but not shown in the figure. The percentages corresponding to the authorship of these blocks may be recorded in the memory 112 as well.

It is understood that the blockchain 300 in the embodiments is merely an example but not to limit the scope of present disclosure. In some embodiments, the blockchain 300 may be in a form with different lengths and the shares of the authorship in such blockchain may be different.

As mentioned, at the first time the device 10 starts up, the processor 114 of the control unit 110 may connect to any available network via the communication unit 130. At that time, the processor 114 of the control unit 110 may access the memory 112 for the peer data of the blockchain 300 and/or the checksum of the last known block (i.e. the last known authoritative block 306 at the time the device 10 was manufactured). In some embodiments, the peer data and the checksum may be used to determine whether the currently connected network is trustable.

Step S220: connecting to a plurality of trusted peers via the network and downloading a latest block header of the trusted peers being connected when each of the plurality of trusted peers is successfully connected.

In some embodiments, according to the peer data (especially the internet addresses of the trusted peers), the processor 114 may process a quick update to determine if there are enough previously known trusted peers (or say "known" miners) that can be connected to via the access point 20. According to the blockchain 300 shown in FIG. 3, the peer data may at least record the known miners A-D with their internet addresses. According to each internet address, the processor 114 may try to connect to any of the miners A-D. When one of the miners A-D may be successfully connected, the processor 114 may check if the identity (e.g. public key) presented by this miner matches the cryptographic signature of the miner according to the peer data. If it is determined that the identity of this miner matches its cryptographic signature, the processor 114 may note this miner to be a found trusted peer. In opposite, when the previously known miners in the peer data may not be reached (e.g. those are currently offline or those having identities fail to match the known signatures), the processor 114 may ignore such miner In some embodiments, the processor 114 may try to visit each of the previously known trusted peers until enough previously known trusted peers are found.

In some embodiments, when each of the trusted peers is successfully connected, the processor 114 may download the latest block headers from each found trusted peer (i.e. the current version chain known by this known miner). In this manner, when multiple trusted peers are successfully connected, the processor 114 may get multiple versions of the latest blockchain from these trusted peers.

Step S230: determining whether the latest block header of each of the plurality of trusted peers is referenced to the last known block based on the last known block header hash and verifying the latest block header to form a latest version blockchain when predetermined numbers of the trusted peers are found.

In some embodiments, for each latest block header the processor 114 gets, the processor 114 may check whether the latest block header can be referenced to the block 306 by using the checksum in the block header 306h. If the latest block header from a peer cannot be referenced to the block 306, the processor 114 may not trust this peer. Such peer would be ignored.

In some embodiments, when a number of the found trusted peer exceeds a predetermined threshold (e.g. 10), the processor 114 may stop the connection process and go to verification process. In some embodiments, since the blocks prior to the block 306 may be considered confirmed (with the checksum), the processor 114 may execute the verification process by checking the blocks subsequent to the last known block 306. In a case, if the latest block headers downloaded from these found trusted peers are all identical, the processor 114 may stop the process and confirm the version from these peers to be the authoritative blockchain. In this way, the processor 114 may get the newest block trusted by the previously known miners in the network fast. That is how the processor 114 executes the quick update process.

It is noted that the predetermined threshold in the embodiments is for exemplary purpose but not to limit the scope of present disclosure. The predetermined threshold may be set to any number (e.g. 50 or 100) according to the requirements of the manufacturer or the total number of the miners in the network. In some embodiments, the value of the predetermined threshold may be determined dynamically as the "relative" majority of the network at the block head hash known to the device 10. For instance, according to the peer data in the above embodiments, the miner B created 15% of blocks, the miner C created 13% of blocks and the miner D created 14% of blocks. If the processor 114 finds the miners B-D may all be successfully connected when it connected to the network, the current version blockchain (i.e. the version according to the latest block header) from this majority (miners B-D have authored over 50% of the blocks) may be determined the authoritative one.

In some embodiments, if there are no trusted peers that the processor may successfully connect to or the number of trusted peers is smaller than the predetermined threshold, the processor 114 may execute a slow update in order to discover more trustable miners in the network.

In some embodiments, if the processor 114 cannot reach enough trusted peers in the network or the processor 114 is not provided with the peer data, the processor 114 may process the slow update to discover alternative peers, according to the internet addresses in the block headers. To start the slow update, the processor 114 may also use the checksum of the block header 306h to validate connectable miners in the network. In one embodiment, the processor 114 may continue the slow update by identifying alternative peers from further history (i.e. do a backward search). When the processor 114 successfully connects to at least one unknown miner (i.e. not trusted peer), the processor 114 may request the block header 306h from this unknown peer and verify its correctness using the block header hash of 306h from the processors 114 memory. Further, the processor 114 may request previous block header 305h and verify its correctness using the block header hash of 305h that is contained in block header 306h. Once correctness is verified, the processor can take note of the address and identity of the author of block 305 as a trusted peer.

In some embodiments, if the processor 114 fails to connect any unknown miner providing the verifiable block headers according to the checksum of the block header 306h, it is determined that the device 10 may be connected to a network in manipulation. It is to say, the processor 114 may assume the access point 20 is a compromised node. In this case, the processor 114 may redirect to another accessible network for validation or abort the validation process and report an error.

In some embodiments, if the processor 114 successfully finds the new trusted peer according to the checksum of the block header 306h. Then, the processor 114 may incrementally download and verify more previous block headers 304h, 303h, 302h and so on to discover more trusted peers. It is noted that each block headers 304h, 303h, 302h is stored with an internet address of its creator. Therefore, via the internet address, the processor 114 may try to connect to the creators (i.e. peers) of these blocks in order to discover trusted peers.

Then, the processor 114 may try to connect to this trusted peer. Again, if this block creator is successfully connected and a latest block header downloaded therefrom may be referenced to the block 306, the processor 114 may note another latest block header candidate from a trusted peer in the network. If this peer is not connectable or a latest block header downloaded therefrom is not referenced to the block 306, the processor 114 may skip to another one who created the next previous block. This routine may be understood as a backward search. The processor 114 may continue this routine until a number of the trusted peers are found and connected so that a sum of the number of the connected previously known trusted peers and the number of the trusted peers from the backward search exceeds the predetermined threshold.

As mentioned, in a case that the number of previously known trusted peers being successfully connected is smaller than the predetermined threshold, the processor 114 may update the peer data by replacing those unconnectable previously known trusted peers with the trusted peers from the backward search. In this way, the processor 114 may update the peer data according to current network topology.

In some embodiments, if the processor 114 fails to connect to enough (e.g. the sum fails to meet the threshold) trusted peers, the processor 114 may also determine that the device 10 is connected to a network in manipulation.

In some embodiments, when the processor 114 is successfully connected to enough trusted peers (both the previously known peers and the newly discovered peers), the processor 114 may go through the linkage between the latest block headers and the last known block. In some embodiments, the processor 114 may incrementally verify a plurality of blocks between the latest block headers and the last known block to validate the latest version blockchain.

Figure 4:
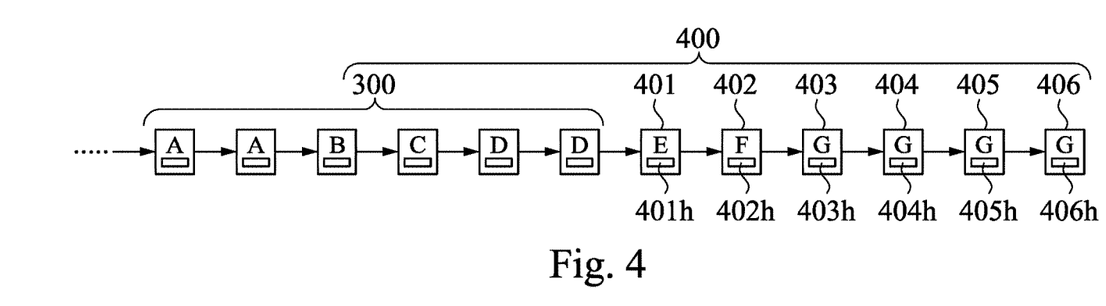
FIG. 4 is a schematic diagram showing parts of a blockchain according to some embodiments of present disclosure.

For better understandings, reference may be made to FIG. 4. FIG. 4 is a schematic diagram showing parts of a blockchain according to some embodiments of present disclosure. FIG. 4 shows one embodiment of the current version blockchain having the blockchain 300 contained therein. It is assumed a period of time has passed so linkage between the blockchain 300 and the current version blockchain is not known to processor 114.

As shown in FIG. 4, in some embodiments, a current version blockchain 400 is formed by the trusted blockchain 300 and a tail chain comprising blocks 401-406. The blocks 401-406 are mined when the device 10 was offline. In the embodiment, it is assumed that the block 401 is mined by a well-behaved miner E and the block 402 is mined by a well-behaved miner F. Both blocks 401-402 belong to the authoritative blockchain. The blocks 403-406 are created by a malicious miner G and not part of the authoritative blockchain. It is assumed that these miners are all recorded in the peer data but the miner G was compromised after the device 10 was manufactured. That is to say, the current version blockchain 400 is a non-authoritative chain. In the embodiments, it is assumed that, according to the peer data, the miner E created 15% of blocks in the blockchain 300, the miner F created 25% of blocks in the blockchain 300, and the miner G created 8% of blocks in the blockchain 300 (the percentages are based on history of blocks up to the last known block authoritative known to the device). According to the mechanism of present disclosure, the signatures of the miners may be recorded in the block headers 401h-406h, respectively.

In some embodiments the block authorship percentages before the last known authoritative block are not stored on memory 112 but first need to be established by processor 114 through means of the backward search. The processor 114 may fetch and verify the previous (i.e. 100) block headers from the connected peer and create the authorship percentage based on the retrieved block header.

In some embodiments, if the processor 114 accesses this current version blockchain 400 from a peer via currently connected network, the processor 114 may locate the block 306 in the blockchain 400 with the checksum. Next, since the block header 306h is referenced by other block headers in the blockchain 400, the processor 114 may perform a forward search to the following blocks (i.e. the blocks 401-406 behind block 306) in the blockchain 400 to establish a new known authoritative last block.

The forward search is an iterative calculation process (or say incremental verification) used to determine whether to trust the following blocks in the blockchain 400. In order to do that, a cross-reference check to each of the blocks behind the block 306 in the blockchain 400 is performed. At each block, the processor 114 may check the authorship of the block and apply some evaluating parameters to the block. In some embodiments, to apply the evaluating parameters is to accumulate a total percentage of known miners according to the peer data. If the accumulated percentages of different known miners (i.e. peers) exceed a predetermined threshold, the processor 114 determines to trust the block as being authoritative. The miner of the block may be recognized as a new trusted miner to the degree they have authored blocks in the authoritative blockchain.

In some embodiments, when each time the forward search moves to the next block, the processor 114 may determine whether any of the total scores (i.e. the accumulated percentages) corresponding to a block exceeds the predetermined threshold. According to the principle of 51% attack, in some embodiments, the predetermined threshold may be set as 50% (or any percentage over 50%). It is to say, if it is confirmed that over 50% of known miners by block authorship distribution have seen (or be referenced to) a block, the processor 114 may accept such block to be trusted as a part of the authoritative blockchain. In other words, until a block being proven accepted by over 50% of known miners by block authorship distribution, the block is not trusted.

In some embodiments, in the blockchain 400, the forward search of the processor 114 may be started from the first block behind (or say subsequent to) the block 306, which is the block 401 created by the miner E. The processor 114 may read the authorship of the block 401 from the block header 401h. According to the peer data, the miner E is a peer which created 15% of blocks in the blockchain 300. Therefore, the processor 114 may get the forward search result at block 401 to be: for block 401, the miner E contributes a 15% score, and the total score (i.e. the accumulated percentages) is 15%. In other words, the peer data shows the block 401 is 15% trustworthy since it is signed by a known miner E.

In some embodiments, next, the forward search goes to the block 402 created by the miner F. According to the peer data, the miner F is a peer which created 25% of blocks in the blockchain 300. Therefore, the processor 114 may get the forward search result at the block 402 as: for the block 401, the miner E contributes a 15% score, the miner F contributes a 25% score, and the total score is 40%; for the block 402, the miner F contributes a 25% score, and the total score is 25%. In other words, when the forward search to the block 402 is executed, the peer data shows the block 401 is 40% trustworthy for being referencing to by two known miners (i.e. the miners E-F) and the block 402 is 25% trustworthy for being signed by a known miner (i.e. the miner F).

In some embodiments, the forward search then goes to the block 403 created by the miner G. According to the peer data, the miner G created 8% of blocks in the blockchain 300. Therefore, the processor 114 may get the forward search result at the block 403 to be: for the block 401, the miner E contributes a 15% score, the miner F contributes a 25% score, the miner G contributes an 8% score, and the total score is 48%; for the block 402, the miner F contributes a 25% score, the miner G contributes an 8% score, and the total score is 33%; for the block 403, the miner G contributes an 8% score, and the total score is 8%. The processor 114 may determine that the blocks 401-403 are yet to be trusted according to the forward search result at the block 403.

In some embodiments, next, the forward search moves to the block 404, which was also created by the miner G. It is noted that, in present disclosure, the accumulated percentages only count different miners. Therefore, the forward search result at the block 404 would still be: for the block 401, the miner E contributes a 15% score, the miner F contributes a 25% score, the miner G contributes a 8% score, and the total score is 48%; for the block 402, the miner F contributes a 25% score, the miner G contributes a 8% score, and the total score is 33%; for the block 403, the miner G contributes a 8% score, and the total score is 8%. Accordingly, it may be foreseen that the forward search results at the blocks 405-406 would not increase the score further and thus none of the blocks would be accepted.

As shown in the embodiments of FIG. 4, when the forward searches to the blocks 401-406 are done, the processor 114 may not find any of the blocks trusted since the total scores corresponding to these blocks are all failing to exceed the predetermined threshold (i.e. 50%). That is to say, in the embodiments, since the blocks 403-406 are created by the same miner and not part of the authoritative chain, it results in that the blocks 401-406 are not seen by enough known miners to the device 10. In such case, the processor 114 may not trust the blocks 401-406 received according to the peer data. As the mechanism rules out the data sent by the compromised miner, it shows the capability of man-in-the-middle attack prevention.

Figure 5:
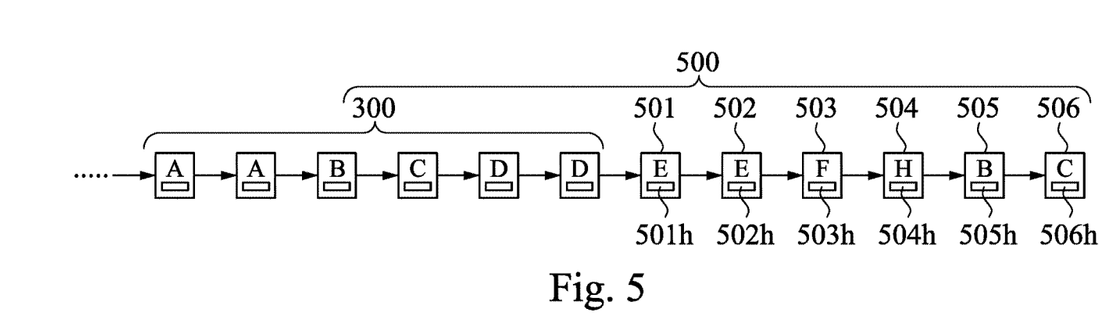
FIG. 5 is a schematic diagram showing parts of a blockchain according to some embodiments of present disclosure.

For better understandings, reference may be made to FIG. 5. FIG. 5 is a schematic diagram showing parts of a blockchain according to some embodiments of present disclosure. FIG. 5 shows another embodiment of the current version blockchain having the blockchain 300 contained therein. It is also assumed a period of time has passed so linkage between the blockchain 300 and the current version blockchain is not known to processor 114.

As shown in FIG. 5, in some embodiments, a current version blockchain 500 is formed by the trusted blockchain 300 and a tail chain comprising blocks 501-506. The blocks 501-506 are mined when the device 10 was offline. In the embodiment, the block 501-502 is mined by the miner E, the block 503 is mined by the miner F, the block 504 is mined by a miner H, the block 505 is mined by the miner B and the block 505 is mined by the miner C. That is to say, the blockchain 500 is the authoritative chain in the network. According to the mechanism of present disclosure, the signatures of these miners may be recorded in the block headers 501h-506h, respectively.

In a case that the processor 114 accesses this current version blockchain 500 from a temporarily trusted peer via currently connected network, the processor 114 may first try to locate the block 306 in the blockchain 500 with the check sum. Next, since the block header 306h is referenced to other block headers in the blockchain 500, the processor 114 may perform a forward search to the following blocks (i.e. the blocks 501-506 behind the block 306) in the blockchain 500 in order to establish a new known authoritative last block.

Similar to the embodiments of FIG. 4, in some embodiments of FIG. 5, the forward search may be used to determine whether to trust the following blocks in the blockchain 500. At each of the blocks 501-506, the processor 114 may check the authorship of the block and accumulate a total percentage of known miners according to the peer data. If the accumulated percentages of different known miners (i.e. peers) exceed a predetermined threshold, the processor 114 determines to trust the block. The blocks may be recognized as authoritative blocks.

In some embodiments, the forward search from the block 501 to the block 502 may be listed below. When the forward search goes to the block 501, the forward search result may be: For block 501, the miner E contributes a 15% score, and the total score (i.e. the accumulated percentages) is 15%. When the forward search goes to the block 502, the forward search result may be: for block 501, the miner E contributes a 15% score, and the total score is 15%; for the block 502, the miner E contributes a 15% score, and the total score is 15%.

In some embodiments, when the forward search goes to the block 503, the forward search result may be: for block 501, the miner E contributes a 15% score, the miner F contributes a 25% score, and the total score is 40%; for the block 502, the miner E contributes a 15% score, the miner F contributes a 25% score, and the total score is 40%; for the block 503, the miner F contributes a 25% score, and the total score is 25%.

In some embodiments, when the forward search goes to the block 504 created by the miner H, the processor 114 may choose to pass (or pause) the percentage accumulation since the miner H is unknown according to the peer data. Therefore, the forward search result at the block 504 may be: for block 501, the miner E contributes a 15% score, the miner F contributes a 25% score, the miner H contributes a 0% (unknown) score, and the total score is 40%; for the block 502, the miner E contributes a 15% score, the miner F contributes a 25% score, the miner H contributes a 0% score, and the total score is 40%; for the block 503, the miner F contributes a 25% score, the miner H contributes a 0% score, and the total score is 25%; for the block 504, the miner H contributes a 0% score, and the total score is 0%.

In some embodiments, when the forward search goes to the block 505, the processor 114 may restart the percentage accumulation when a block achieves a score above the predetermined threshold (i.e 50%). The forward search result at the block 505 may be: for block 501, the miner B contributes a 15% score, the miner E contributes a 15% score, the miner F contributes a 25% score, miner H contributes a 0% (unknown) score, and the total score is 55%; for the block 502, the miner B contributes a 15% score, the miner E contributes a 15% score, the miner F contributes a 25% score, miner H contributes a 0% score, and the total score is 55%; for the block 503, the miner B contributes a 15% score, the miner F contributes a 25% score, miner H contributes a 0% score, and the total score is 40%; for the block 504, the miner B contributes a 15% score, the miner H contributes a 0% score, and the total score is 15%; for the block 505, the miner B contributes a 15% score, and the total score is 15%.

Here, since the total scores (i.e. the accumulated percentages) of the blocks 501-502 exceed the predetermined threshold (i.e. 50%), the processor 114 may determine to trust the blocks 501-502 and stop the percentage accumulation to the blocks 501-502. At this point the processor 114 may recalculate the authorship distribution now including the blocks 501-502. Since the blocks 501-502 are mined by the miner E the corresponding contribution may increase from 15% to 17% (i.e. when the authorship distribution is based on the last 100 blocks).

In some embodiments, when the forward search goes to the block 506, the processor 114 may continue the percentage accumulation since at least the miner C is also known according to the peer data. The forward search result at the block 506 may be: for the block 503, the miner B contributes a 15% score, the miner C contributes a 13% score, the miner F contributes a 25% score, the miner H contributes a 0% score, and the total score is 53%; for the block 504, the miner B contributes a 15% score, the miner C contributes a 13% score, the miner H contributes a 0% score, and the total score is 28%; for the block 505, the miner B contributes a 15% score, the miner C contributes a 13% score, and the total score is 28%. Again, since the total score of the block 503 exceeds the predetermined threshold (i.e. 50%), the processor 114 may determine to trust the block 503 and stop the percentage accumulation to the block 503 and recalculate the authorship distribution.

As shown in the embodiments of FIG. 5, when the forward searches to the blocks 501-506 are done, the processor 114 may trust the blocks 501-503 to be part of the authoritative blockchain. That is to say, in the embodiments, the blocks 501-503 are referenced by enough known miners. Each time the processor 114 trusts a new block to be part of the authoritative blockchain because it's score is above the predetermined threshold, the processor 114 may update the block to be the last known block in the current version blockchain, and may store this to its memory 112 overriding the previous value.

It is noted that, in foregoing embodiments, despite the miner H has no contribution to the total score, it may be foreseen that the block 504 would end up to be trusted when enough blocks mined by the known peers are found behind the block 504. At the time the block 504 is trusted, the processor 114 may note the miner H to be a new trusted peer to the degree it has authored blocks in the authoritative blockchain. In this exemplary embodiment, the processor 114 may recalculate the authorship distribution and miner H may contribute a 1% (i.e if the distribution authorship is based on the previous 100 blocks) trustworthiness score to forthcoming blocks. It can be seen that as this proceeds that miner H might earn a higher trustworthiness score over time.

In some embodiments, when the miner H is trusted, for having trustworthiness score higher than a threshold, by the processor 114 and the miner H is successfully connected, the processor 114 may replace an offline trusted peer in the peer data with the miner H. According to the approach, this is how the processor 114 discovers new trusted peers by using references between the block headers in the current version chain. When a long period of time has passed, the mechanism may adapt the device 10 to current blockchain topology with many unknown miners.

In some embodiments when the forward search concludes and decides a block 504 as part of the authoritative chain, the processor 114 may start a backwards search from this block 504. This is in order to check with additional peers of the authoritative chain whether there is any version with further blocks of the authoritative chain available. Once the processor 114 has successfully visited a threshold number of trusted peers, it may conclude the most recent version to be the one it knows.

In some embodiments the processor 114 may receive additional further blocks from the new discovered peers and then restart the forward search until no further blocks are being identified and all visited peers confirm the last retrieved version to be the most recent version of the authoritative blockchain. At that point the processor 114 may read the timestamp from this most recent authoritative block header (i.e. 504h). In this exemplary embodiment, the processor 114 may take note that the current time is approximately to the timestamp of block header 504h.

It can be seen how forward and backward search may be employed to work hand-in-hand by the processor 114. While the forward search confirms whether a certain block header is part of the authoritative blockchain, the backward search may ensure that the most current version blockchain is found.

It should be understood that the embodiments of FIG. 5 are for exemplary purpose but not to limit the scope of present disclosure. The concept is to establish the foregoing iterative reference check to validate "unknown" blocks in the current version blockchain using the variety of the known miners in the network. Despite new miners may join the network, the percentages of the known miners are still helpful for the processor 114 to find the trusted blocks (and their miners). Theoretically, if the current version blockchain is authoritative, the processor 114 may eventually trust most of the blocks in the chain with the provided approach. And if the current version blockchain is non-authoritative, the processor 114 may not trust any non-authoritative in the chain with the provided approach.

In some embodiments, the processor 114 may continue to discover new trusted miners in the network to replace the offline known miners. When each of the connectable trusted miners in the peer data is found, the processor 114 may download current version blockchain from the miner. Until a predetermined number (e.g. 3-50) of trusted miners provide the same version blockchain, the processor 114 may determine the version to be the most current version of the authoritative blockchain.

It is noted that the predetermined numbers in the embodiments are for exemplary purpose but not to limit the scope of present disclosure. The predetermined threshold may be set to any number according to the requirements of the manufacturer or the total number of the miners in the network. In some embodiments, the value of the predetermined threshold may be determined by the "relative" majority of the network when the device 10 was manufactured or at rum time by the device 10 based in the current last known blockchain version.

As mentioned, in some embodiments, the processor 114 may get the authoritative blockchain when the predetermined numbers of trusted peers are successfully connected. From the latest block headers in the authoritative blockchain, the processor 114 may retrieve the actual current time from the newest block and use for the validation of the PKI certificates.

In view of foregoing embodiments, present disclosure provides two ways to establish secured connection to a network via blockchain. The quick update is efficient since it saves time when enough trusted peers are immediately found connected. The slow update is effective since it ensures a connection under a new topology of the network when not enough trusted peers are found connectable. This may be especially the case when the device 10 was offline for an extended period of time, such as multiple years.

Although the present disclosure has been described in considerable detail with reference to certain embodiments thereof, other embodiments are possible. Therefore, the spirit and scope of the appended claims should not be limited to the description of the embodiments contained herein. It is noted that the approach of present disclosure may still work to a blockchain mechanism under Proof-of-Stake (PoS) design or other consensus mechanisms.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for establishing secured connection on an apparatus, comprising:
    connecting to a network, by the apparatus;
    retrieving a last known block header hash corresponding to a last known block in a last known blockchain from a memory of the apparatus;
    connecting to a plurality of trusted peers via the network;
    in response to each of the plurality of trusted peers being successfully connected, downloading a latest block header of the trusted peers being connected respectively;
    based on the last known block header hash, determining whether the latest block header of each of the plurality of trusted peers is referenced to the last known block; and
    in response to a first number exceeding a threshold number, stopping the step of connecting to the plurality of trusted peers to perform a verification step to verify the latest block header to form a current version blockchain extending from the last known blockchain,
    wherein the first number is a number of first peers in the plurality of trusted peers being successfully connected, and the first peers have the latest block header being referenced to the last known block.

2. The method of claim 1, wherein each block header corresponding to each block of the last known blockchain is stored with an internet address of a peer that created such block, and connecting to the plurality of trusted peers further comprising:
    connecting to the plurality of trusted peers according to the internet addresses of the plurality of trusted peers.

3. The method of claim 1, further comprising:
    retrieving a peer data corresponding to the plurality of trusted peers each with a cryptographic signature;
    based on the cryptographic signature in the peer data, checking whether a connection to each of the plurality of trusted peers is successful;
    verifying whether the latest block headers from the plurality of trusted peers having the latest block header being referenced to the last known block are identical; and
    in response to the latest block headers being identical, validating the latest block headers to form the current version blockchain.

4. The method of claim 1, further comprising:
    retrieving a peer data corresponding to the plurality of trusted peers each with a cryptographic signature;
    based on the cryptographic signature in the peer data, determining whether a connection to each of the plurality of trusted peers is successful;
    in response to the first number being less than the threshold number, discovering a second number of connectable peers until a sum of the first number and the second number at least exceeding the threshold number, wherein each of the second number of connectable peers has a latest block header being referenced to the last known block;
    downloading the latest block header of the second number of connectable peers respectively; and
    incrementally verifying a plurality of blocks between the latest block header and the last known block to form the current version blockchain.

5. The method of claim 1, wherein verifying the latest block header to form the current version blockchain extending from the last known blockchain comprises:
    downloading a latest block header of the first peers respectively;
    incrementally verifying a plurality of blocks between the latest block header and the last known block;
    assigning a plurality of scores to each of the plurality of blocks, wherein each of the scores is corresponding to one of the first peers that has cryptographic signatures in one or more of the plurality of blocks prior to each of the plurality of blocks;
    incrementally determining whether a sum of the scores of each of the plurality of blocks exceeds a validation threshold;
    in response to the sum of the scores of each of the plurality of blocks exceeding the validation threshold, validating such block; and
    chaining the validated blocks to form the current version blockchain extending from the last known blockchain.

6. The method of claim 5, wherein each of the scores is a block authorship distribution of each of the first peers that has the cryptographic signatures in the last known blockchain.

7. The method of claim 5, further comprising:
    in response to the sum of the scores of any of the plurality of blocks failing to exceed the validation threshold, untrusting such block.

8. The method of claim 5, wherein the validation threshold is determined according to a relative majority of a number of the plurality of trusted peers.

9. The method of claim 4, further comprising:
    in the peer data, replacing a number of second peers in the plurality of trusted peers that are not successfully connected by the apparatus with the second number of connectable peers.

10. The method of claim 4, further comprising:
    in response to the sum of the first number and the second number failing to exceed the threshold number, determining that the apparatus is in manipulation.

11. The method of claim 1, further comprising:
    obtaining a current time corresponding to the latest block header of the latest version blockchain.

12. An apparatus for establishing secured connection comprising:
    a memory configured to store computer readable instructions and a last known block header hash corresponding to a last known block in a last known blockchain; and
    a processor electrically coupled to the memory and configured to retrieve the computer readable instructions to execute at least the following steps:
    connecting to a network;
    retrieving the last known block header hash;
    connecting to a plurality of trusted peers via the network;
    in response to each of the plurality of trusted peers being successfully connected, downloading a latest block header of the trusted peers being connected respectively;
    based on the last known block header hash, determining whether the latest block header of each of the plurality of trusted peers is referenced to the last known block; and
    in response to a first number exceeding a threshold number, stopping the step of connecting to the plurality of trusted peers and going to a verification step to verifying the latest block header to form a current version blockchain extending from the last known blockchain,
    wherein the first number is a number of first peers in the plurality of trusted peers being successfully connected, and the first peers have the latest block header being referenced to the last known block.

13. The apparatus of claim 12, wherein each block header corresponding to each block of the last known blockchain is stored with an internet address of a peer that created such block, and the processor connects to the plurality of trusted peers further comprising:
connecting to the plurality of trusted peers according to the internet addresses of the plurality of trusted peers.

14. The apparatus of claim 12, wherein the processor further configured to retrieve the computer readable instructions to execute the following:
retrieving a peer data corresponding to the plurality of trusted peers each with a cryptographic signature;
based on the cryptographic signature in the peer data, checking whether a connection to each of the plurality of trusted peers is successful;
verifying whether the latest block headers from the plurality of trusted peers having the latest block header being referenced to the last known block are identical; and
in response to the latest block headers are identical, validating the latest block headers to form the current version blockchain.

15. The apparatus of claim 12, wherein the processor further configured to retrieve the computer readable instructions to execute the following:
retrieving a peer data corresponding to the plurality of trusted peers each with a cryptographic signature;
based on the cryptographic signature in the peer data, checking whether a connection to each of the plurality of trusted peers is successful;
in response to the first number being less than the threshold number, discovering a second number of connectable peers based on internet addresses until a sum of the first number and the second number at least exceeding the threshold number, wherein each of the second number of connectable peers has a latest block header being referenced to the last known block;
downloading the latest block header of the second number of connectable peers respectively; and
incrementally verifying a plurality of blocks between the latest block header and the last known block to form the current version blockchain.

16. The apparatus of claim 12, wherein the processor incrementally verifies the latest block header to form the current version blockchain extending from the last known blockchain further comprises:
downloading a latest block header of the first peers respectively;
incrementally verifying a plurality of blocks between the latest block header and the last known block;
assigning a plurality of scores to each of the plurality of blocks in the linkage, wherein each of the scores is corresponding to one of the first peers that has cryptographic signatures in one or more of the plurality of blocks prior to each of the plurality of blocks;
incrementally determining whether a sum of the scores of each of the plurality of blocks exceeds a validation threshold;
in response to the sum of the scores of each of the plurality of blocks exceeding the validation threshold, validating such block; and
chaining the validated blocks to form the current version blockchain extending from the last known blockchain.

17. The apparatus of claim 16, wherein each of the scores is a block authorship distribution of each of the first peers that has cryptographic signatures in the last known blockchain.

18. The apparatus of claim 16, wherein the processor incrementally verifies the latest block header to form the current version blockchain extending from the last known blockchain further comprises:
in response to the sum of the scores of any of the plurality of blocks failing to exceed the validation threshold, untrusting such block.

19. The apparatus of claim 16, wherein the validation threshold is determined according to a relative majority of a number of the plurality of trusted peers.

20. The apparatus of claim 15, wherein the processor further configured to retrieve the computer readable instructions to execute the following:
in the peer data, replacing a number of second peers in the plurality of trusted peers that are not successfully connected by the apparatus with the second number of connectable peers.

21. The apparatus of claim 15, wherein the processor further configured to retrieve the computer readable instructions to execute the following:
in response to the sum of the first number and the second number failing to exceed the threshold number, determining that the apparatus is in manipulation.

22. The apparatus of claim 12, wherein the processor further configured to retrieve the computer readable instructions to execute the following:
obtaining a current time corresponding to the latest block header of the latest version blockchain.

* * * * *